United States Patent [19]
Lubischer et al.

[11] Patent Number: 6,120,003
[45] Date of Patent: *Sep. 19, 2000

[54] VALVE ARRANGEMENT

[75] Inventors: Frank Lubischer, Boppard; Thomas Wald, Hollnich, both of Germany

[73] Assignee: Lucas Industries Public Limited Company, United Kingdom

[*] Notice: This patent is subject to a terminal disclaimer.

[21] Appl. No.: 08/850,994

[22] Filed: May 5, 1997

Related U.S. Application Data

[63] Continuation of application No. PCT/EP95/04356, Nov. 6, 1995.

[30] Foreign Application Priority Data

Nov. 8, 1994 [DE] Germany .............................. 44 39 890

[51] Int. Cl.$^7$ ................ F16K 31/06; F60T 8/36
[52] U.S. Cl. ................ 251/129.02; 251/129.15; 303/119.2
[58] Field of Search ......................... 251/129.02, 129.14, 251/129.15; 303/119.2

[56] References Cited

U.S. PATENT DOCUMENTS

| | | | |
|---|---|---|---|
| 3,818,927 | 6/1974 | Zeuner | 251/129.02 |
| 5,076,538 | 12/1991 | Mohr et al. | 251/129.02 X |
| 5,167,442 | 12/1992 | Alaze et al. | 251/129.02 X |
| 5,237,980 | 8/1993 | Gillier | 251/129.15 X |
| 5,240,227 | 8/1993 | Sich | 251/129.15 X |
| 5,752,750 | 5/1998 | Lubischer et al. | 303/119.2 |

FOREIGN PATENT DOCUMENTS

| | | |
|---|---|---|
| 2036110 | 1/1972 | Germany . |
| 3609340 A1 | 9/1987 | Germany . |
| 3831426 A1 | 4/1989 | Germany . |
| 4002865 A1 | 8/1991 | Germany . |
| 4016754 A1 | 11/1991 | Germany . |
| 4129638 A1 | 3/1993 | Germany . |
| 4137123 A1 | 5/1993 | Germany . |
| 2126297 | 3/1984 | United Kingdom . |
| 95/03197 | 2/1995 | WIPO . |

OTHER PUBLICATIONS

PCT No. PCT/EP95/04356 International Search Report.

*Primary Examiner*—John Rivell
*Attorney, Agent, or Firm*—Wood, Herron & Evans, L.L.P.

[57] ABSTRACT

A valve arrangement, comprising a first and a second fluid connection (16, 20) of respective, predetermined flow cross-sections, at least one valve element (44) which is biased by a first spring arrangement (106) in a first position in which the first and second fluid connection (16, 20) are communicating via a flow path, and a valve actuating means (42) by means of which the valve element (44) can be moved in order to assume a second position in which the first and second fluid connection (20) are closed against each other, is characterized in that the bias of the first spring arrangement (106), the force that can be applied to the valve element (44) by the valve actuating means (42), and the flow cross-sections of the fluid connections (16, 20) are dimensioned in such a manner that with a predetermined fluid pressure at the second fluid connection (20), the valve element (44) opens the second fluid connection (20) to such an extent that a flow path is obtained to the first fluid connection (16).

6 Claims, 2 Drawing Sheets

VALVE ARRANGEMENT

The present application is a continuation of PCT application PCT/EP95/04356, filed Nov. 6, 1995, which is presently pending.

The present invention relates to a valve arrangement with the characteristics of the preamble clause of claim 1.

EP-0492109 A1 describes a non-return valve with a consumer-side valve seat and a pressure generator-side closing element which through magnetic force effect is capable of acting upon an armature at the valve seat. A compression spring is arranged between the armature and the closing element. In the closed valve position, this imparts a closing force on the closing element, which is adapted to the response pressure. In this manner, a non-return valve and a pressure limiting valve are implemented in the valve unit.

From DE-3832023 it is known to provide differently biased non-return valves as safety valves counter parallel to an ASC switching solenoid valve. These non-return valves are, however, constructed as separate assemblies.

From DE-3506287 A1 a solenoid-operated valve for controlling anti-blocking means in motor vehicles is known which controls the pressure drop in the actuating means, by which a blocked wheel is released so that the lost road contact is restored. For this purpose, the solenoid valve comprises an inlet opening to be connected with the control circuit for controlling the motor vehicle brakes, an outlet opening to be connected with an acutating means of the associated brake, and a drain opening to be connected with a drain reservoir. A valve sliding element is used for selectively connecting the outlet opening with the inlet opening and the drain opening. The valve sliding element which is biased by elastic means in a position in which the outlet opening communicates with the inlet opening, can be moved by an electromagnet against the action of the elastic means into a position in which the outlet opening is communicating with the drain opening. A check valve is arranged in the area of the drain valve which allows the fluid to drain only if its pressure exceeds a predetermined threshold value.

From DE-1650574 A1 a solenoid-operatable miniature valve is known, comprising a magnetic system with a radial and an axial air gap, wherin the valve element with the magnetic system excited rests on a valve seat and thus closes the fluid flow path. In this valve, with the magnetic system de-excited, the fluid flow path extends from the valve seat through the magnetic axial air gap, and then facing away from the armature through the valve housing to the outside. Thus, the armature is located in a dead fluid flow space because the fluid flow intersects the magnetic field lines once in the axial air gap and once upon penetrating the housing.

From DE-4112136 A1, a unit comprising a pressure limiting valve and a switching valve for a hydraulic braking system with a locking protection and a traction control means is known. The unit comprises a guide tube formed from a housing jacket with a solenoid accommodated therein for an armature which is accommodated therein in a longitudinally movable manner. The guide tube is closed at both ends by respective yoke members. The first yoke member comprises a first connection of the switching valve. This eccentrically arranged connection communicates with the inner space of the guide tube. The first yoke member additionally comprises the third connection of the switching valve, which extends coaxially to the longitudinal axis of the guide tube. This third connection terminates in a first valve seat. The second yoke member is provided with the centrally arranged second connection of the switching valve. This second connection communicates internally with a second valve seat.

The armature of the switching valve has a tubular shape and comprises an internal collar at the side of the second yoke member. A reset spring which is formed as a helical compression spring bears against this internal collar and acts upon the second yoke member. The armature accommodates two disks which are permeable to a pressure medium and between which a spring which is formed as a helical compression spring is arranged coaxially with the longitudinal axis. The spring is subjected to a biasing force due to which the first disk bears against a stop ring inserted in the armature and the seconds disk bears against the internal collar. On the side of the first yoke member a ball serving as a first closing member is attached to the first disk. The first closing member in cooperation with the valve seat of the first yoke member forms a first seat valve of the switching valve. At the second disk of the armature another ball serving as a second closing member is arranged on the side of the second yoke member. In cooperation with the valve seat of the second yoke member, the closing member forms a seat valve both of the switching valve as well as of the pressure limiting valve.

This arrangement comprises a relatively great number of parts, and its manufacture is complicated.

Consequently, it is the object of the invention to design a valve arrangement which is simpler and can be manufactured with fewer components.

To solve this object, the initially mentioned valve arrangement is further developed by the features of the characterizing clause of claim 1.

In such a valve, the closing force is overcome upon exceeding a limit pressure, and the valve opens so that a further pressure increase is no longer possible. Prior to reaching the limit pressure, the second valve connection is closed against the first valve connection.

According to the invention, a combination of the two valve functions, i.e. maximum pressure limitation and closing the fluid connection, can be provided in a single valve arrangement in order to reduce the required installation space and to facilitate the assembly.

Advantageous embodiments of the valve arrangement are the subjects of further claims.

A preferred embodiment of the inventive valve arrangement will be explained in detail in the following description with reference to the drawings in which.

Figure 1:
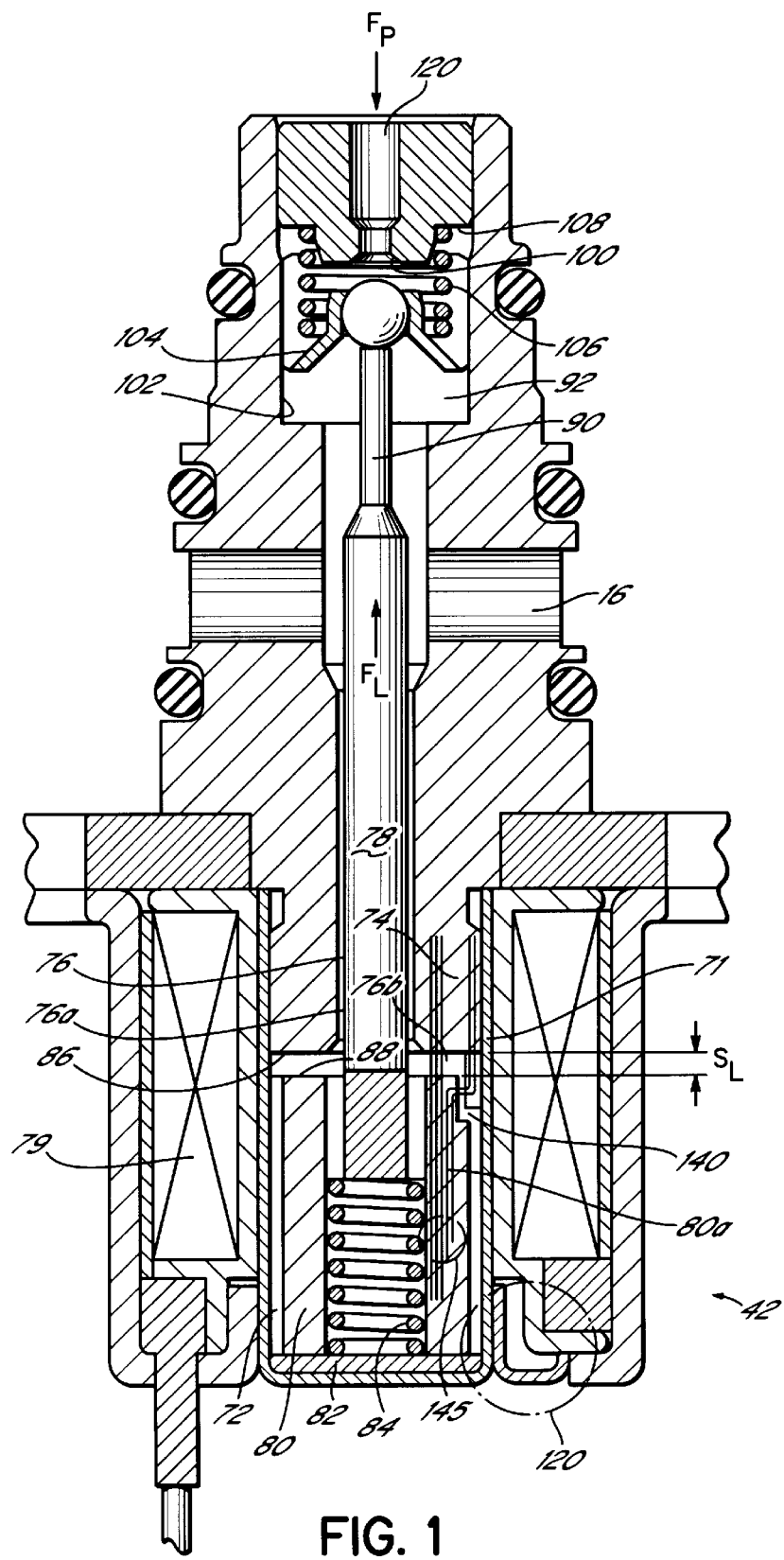
FIG. 1 shows a schematic cross-sectional view of a valve arrangement according to the invention.

FIG. 1 shows a valve arrangement 18 which is designed as a 2/2-way valve with electromagnetic actuation. In the non-actuated condition of the valve arrangement 18 a first fluid connection 16 communicates with a second fluid connection 20 via a flow path.

Upon actuation of the valve arrangement 18, a control signal turns on the valve arrangement 18, i.e. its electromagnet arrangement 42 is activated and a valve member 44 is moved so that the first and the second fluid connection 16, 20 are no longer communicating via a flow path (see FIG. 1).

In the closed condition of the valve arrangement 18 and depending on its application case the fluid pressure can increase both at the first fluid connection as well as on the second fluid connection of the valve arrangement 18. The force $F_P$ which is generated by the pressure increase at the second fluid connection 20 of the valve arrangement 18 is counteracted by the axial component of the magnetic force $F_L$ which is generated by the electromagnet arrangement 42 as the closing force. Due to the predetermined pressure and area ratios in the valve arrangement 18, a certain maximum possible pressure results at the second fluid connection 20, which may, for example, amount to approx. 60 bar. If this maximum possible pressure is exceeded, the valve member 44 clears the second fluid connection 20 so that the overpressure fluid can escape via the first fluid connection 16. The dimensioning of the individual components will be explained later.

In this manner, the maximum possible pressure at the second fluid connection 20 is effectively limited.

The valve arrangement 18 has an essentially cylindrical shape, with the second fluid connection 20 opening into an end face (top in FIG. 1), while the first fluid connection 16 opens radially into the outer wall of the valve arrangement 18.

The electromagnet arrangement 42 is arranged opposite the second fluid connection 20 (at the bottom end of the valve arrangement 18 in FIG. 1).

The electromagnet arrangement 42 comprises an exciting coil 79 which is centered in a recess 72. The exciting winding is designed as a pot coil 79, into the cylindrical recess 72 of which an iron core 74 with a coaxial through-hole 76 projects to approximately half its extension. The through-hole 76 accommodates a coaxially movable plunger armature 78 which at its end reaching into the interior of the pot coil 79 expands to the inner diameter of the pot coil 79 by means of an essentially hollow cylindrical iron body 80. The plunger armature 78 can be supported by a helical spring 84 which is arranged in the interior of the hollow cylindrical body 80 against a stop 82 of the valve arrangement 18.

An air gap SL of variable height is formed between the face 86 of the iron core 74 protruding into the interior of the pot coil 79 and the opposite face 88 of the hollow cylindrical body 80.

At an end 90 remote from the electromagnet arrangement 42, the plunger armature 78 extending through the through-hole 76 projects into a valve chamber 92. The end 90 of the plunger armature 78 is designed as the valve element 44 or contacts the valve element 44 which is formed by a ball 44, for example.

In the rest position of the valve arrangement 18 fluid can flow between the surface of the valve member 44 and the wall 102 of the valve chamber so that the first fluid connection 16 and the second fluid connection 20 communicate.

The valve member is supported by a helical spring 106 against the upper inner face 108 of the valve arrangement 18 so that a defined valve opening in the area of the second fluid connection is obtained.

In the actuated position of the valve arrangement 18 the valve member 44 rests against a valve seat 100 so that the the flow between first fluid connection 16 and the second fluid connection 20 is interrupted.

The following dimensioning rules are intended for the defined adjustment of the closing or holding forces, respectiveley, with the electromagnet arrangement 42 in the excited condition, whereby temperature and voltage variations should be eliminated, if possible.

Because a current regulation of the actuation signal of the electromagnet arrangement 42 is usually not provided, it is not possible to use a proportional magnet. The adjustment of the magnetic forces can thus be achieved only via the air gap $S_L$ and/or a defined material selection or geometric design, respectively.

Figure 2:
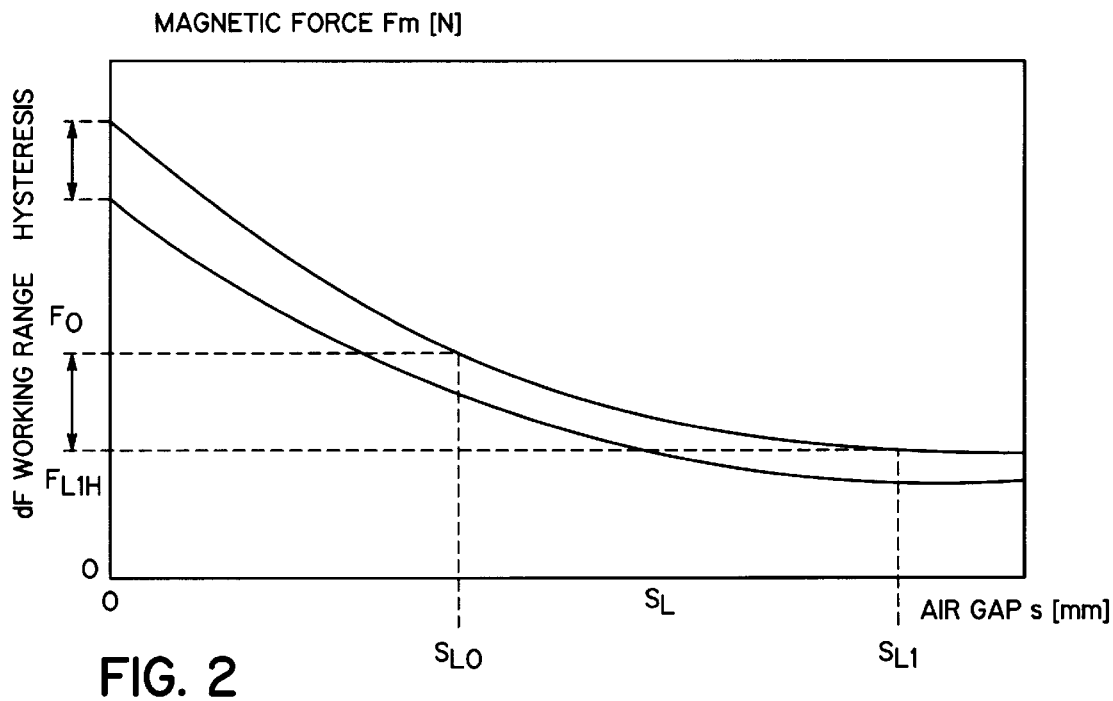
FIG. 2 shows a diagram with the magnetic force of an electromagnet arrangement being plotted versus the width of the air gap.
Figure 3:
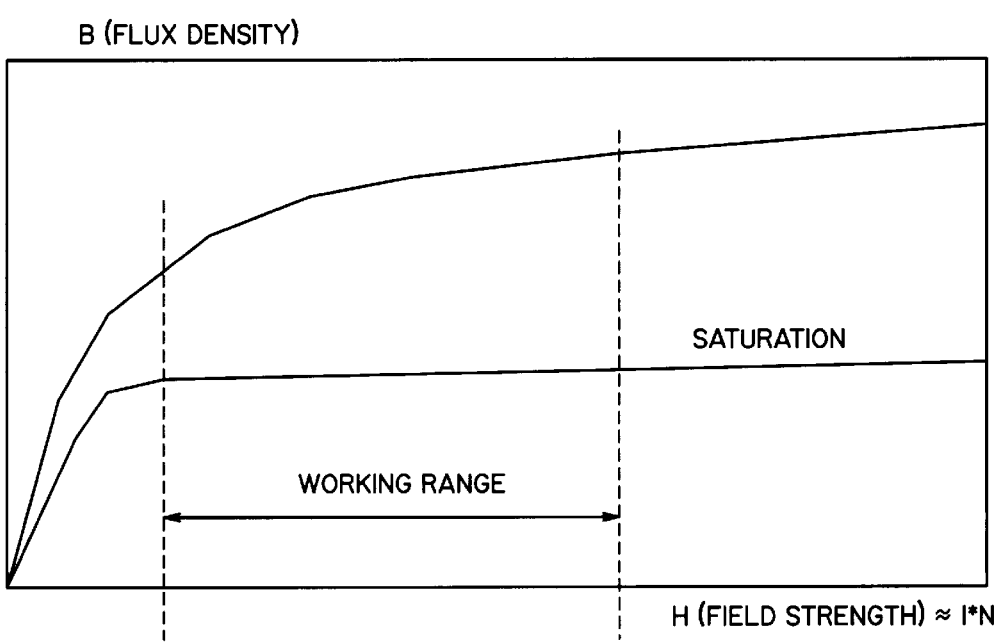
FIG. 3 shows a diagram with the flux density in an electromagnet arrangement being plotted versus the field strength.

In FIGS. 2 and 3 the magnetic force Fm as a function of the height of the air gap $S_L$ or the flux density B as a function of the field intensity H, respectively, are plotted.

As shown in FIG. 2, the magnetic force increases superpro-portionally from a limit air gap $S_{L0}<S_L$. This means that in the range $0 \ldots S_{L0}$ even very small gap changes result in a superproportional increase of the magnetic forces so that the gap tolerances for adjustment must be correspondingly close.

In order to increase the adjustment tolerances it is now proposed to utilize that range of the air gap $S_L$ in which a constant or at least only slightly increasing change of the the magnetic force ($S_{L0}<S_L<S_{L1}$) is used as the gap dimension. Within this curve section, variations of the air gap (tolerance) influence the applied magnetic forces only slightly.

For the purpose of reducing the temperature and voltage sensititivity of the electromagnet arrangement 42 in the valve arrangement, reference is now made to the diagram of FIG. 3.

The temperature and voltage insensitiveness can be achieved by a saturation of the magnetic circuit. In a magnetic circuit the magnetic flux (product of field intensity and area) is constant in any point. It is therefore possible by introducing a material which is conductive for the magnetic flux into the magnetic circuit at any point, e.g. at a point identified by 120 in FIG. 1, to saturate the magnetic circuit.

Upon saturation of the magnetic circuit, a function progress of the magnetic induction B versus the magnetic excitation H (I) according to FIG. 3 is obtained. If the electromagnet arrangement 42 is operated in the essentially constant range of FIG. 3, the temperature influence can almost completely be eliminated, because here the magnetic circuit is always saturated. The lower working range thereby results from the minimum voltage ($U_{min}$), the maximum resistance ($R_{max}$) and the maximum temperature ($T_{max}$). The upper working range analogously results from the maximum voltage ($U_{max}$), the minimum resistance ($R_{min}$) and the minimum temperature ($T_{min}$).

With these data the response point of the valve arrangement 18 can be established under consideration of the spring force of the spring 106 or the resulting spring force of the springs 84 and 106 as well as the dimensions of the valve seat 100 in which the displacement of the valve element 44 caused by the electromagnet arrangement 42 is overcome by a pressure prevailing at the second fluid connection 20 to such an extent that the ball 44 is forced off its valve seat 100 so that the valve chamber 92 and thus both fluid connections 16, 20 of the valve arrangement 18 are communicating via flow paths.

Upon current supply to the excitation coil 79 an axial force is generated at the armature 78 via the electromagnet arrangement. This force is capable of shifting the valve element 44 against the force of the helical spring 106 so that the valve element 44 comes into contact with its valve seat 100. This blocks the flow communication between the first fluid connection 16 and the second fluid connection 20.

Due to the dimensioning of the valve areas, the spring forces and the magnetic forces, the hydraulic force at the fluid connection 20 after exceeding a certain level is sufficient to lift the valve element 44 off its valve seat 100. As soon as this situation occurs fluid will flow to the first fluid connection 16 and until any prevailing overpressure is relieved. The pressure at the second fluid connection 20 will break down immediately, and the magnetic force can close the valve seat 100 again. This opening and closing operation can be repeated continuously in a kind of "shuttle movement".

In this manner, the pressure in the second fluid connection 20 can be limited to a presettable value. A further parameter for setting the forces that can be generated by the electromagnet arrangement 42 utilizes the effect of the so-called magnetic force shearing phenomenon. The magnetic forces are effective not only in the axial direction of the plunger armature 78 but also transversely to it. As soon as the plunger armature 78 enters the shearing range, the axial force component is reduced by the then generated transverse force.

For this purpose, the through-hole 76 is formed as a stepped hole 76a, 76b, as shown in FIG. 1. The hollow cylindrical part formed at the plunger armature 78 is correspondingly provided with a step 140 at the side facing to the interior of the excitation coil 79 so that a tapering part 80a can extend into the portion 76b of the stepped hole.

Upon insertion, a portion of the magnetic flux is built-up in the transverse direction and does not contribute to the closing force of the valve. This means that the transverse force reduces the force available for keeping the valve closed in a predeterminable manner. Field lines identified by reference numeral 145 are so branched that the progressively increasing range of the magnetic force curve can be considerably dampened so that the magnetic force variation function can be shifted over the air gap into a range of relative constancy which is almost independent of the dimensional tolerance of the air gap.

In addition, the stepped design of the iron core 74 and the plunger armature 78 with its cylindrical extension 80, 80a reduces the cross-sectional area of the air gap, which enables the saturation of the magnetic circuit at lower current values.

What is claimed is:

1. A valve arrangement, comprising
a first and a second fluid connection (16, 20) of respective, predetermined flow cross-sections,
at least one valve element (44) which is biased by a first spring arrangement (106) in a first position in which the first and second fluid connection (16, 20) are communicating via a flow path, and
a valve actuating means (42) with an electromagnet arrangement (42), with the electromagnet arrangement (42) being constituted by at least one exciter winding (70) which is connected with an iron core (74) which cooperates with a rigidly connected armature element (78) and body (80) via a variable air gap ($S_L$) by means of which the valve element (44) can be moved in order to assume a second position in which the first and second fluid connection (20) are closed against each other, whereby in said second position
the biasing force of the first spring arrangement (106) and the flow cross-sections of the first and second fluid connections (16, 20)
are so determined, as well as
the adjustable electromagnetic force that can be applied by valve actuation means (42) to the valve element (44) is so dimensioned, that
with a predetermined fluid pressure at the second fluid connection (20) the valve element (44) opens the second fluid connection (20) to such an extent that the first and second fluid connection (16, 20) communicate via a flow path,
and wherein at least a section of the air gap ($S_L$) of the electromagnet arrangement (42) has a stepped cross-sectional shape (71).

2. The valve arrangement according to claim 1, characterized in that upon the excitation of the electromagnet arrangement (42), the variation of the air gap ($S_L$) occurs in a range in which the generated magnetic force changes at least approximately linearly.

3. The valve arrangement according to claim 1, characterized in that the electromagnetic arrangement (42) can be operated in the magnetic saturation.

4. The valve arrangement according to claim 1, characterized in that the valve actuating means (42) is formed as a pot coil (79) with an iron core (74) and a plunger armature (78, 80).

5. The valve arrangement according to claim 1, characterized in that the valve actuating means (42) is biased in the direction of the second position of the valve element (44) by a second spring arrangement (84), with the spring forces of the two spring arrangements (106, 84) being so dimensioned that with the excited valve actuating means and with predetermined pressures being applied to the first and second fluid connection (16, 20) the valve element (44) is not lifted off its valve seat (100).

6. The valve arrangement according to claim 1, characterized in that the valve element (44) and the actuation means (90) are designed as separate components.

* * * * *

UNITED STATES PATENT AND TRADEMARK OFFICE
CERTIFICATE OF CORRECTION

PATENT NO.    : 6,120,003
DATED         : September 19, 2000
INVENTOR(S)   : Frank Lubischer and Thomas Wald It is certified that error appears in the above-identified patent and that said Letters Patent is hereby corrected as shown below:

Column 1,
Line 41, reads "solenoid-operatable" and should read -- solenoid-operable --.
Line 43, reads "wherin" and should read -- wherein --.

Column 2,
Line 14, reads "seconds disk bears…" and should read -- second disk bears… --.

Column 3,
Line 39, reads "An air gap SL…" and should read -- An air gap $s_L$… --.
Line 58, reads "…so that the the flow…" and should read -- …so that the flow… --.
Line 63, reads "respectiveley" and should read -- respectively --.

Column 4,
Lines 3, 6, 9, 10 and 17, read "$S_L$" and should read -- $s_L$ --.
Line 9, reads "superpro-portionally" and should read -- superproportionally --.

Signed and Sealed this

Eighteenth Day of February, 2003

JAMES E. ROGAN
*Director of the United States Patent and Trademark Office*